UNITED STATES PATENT OFFICE.

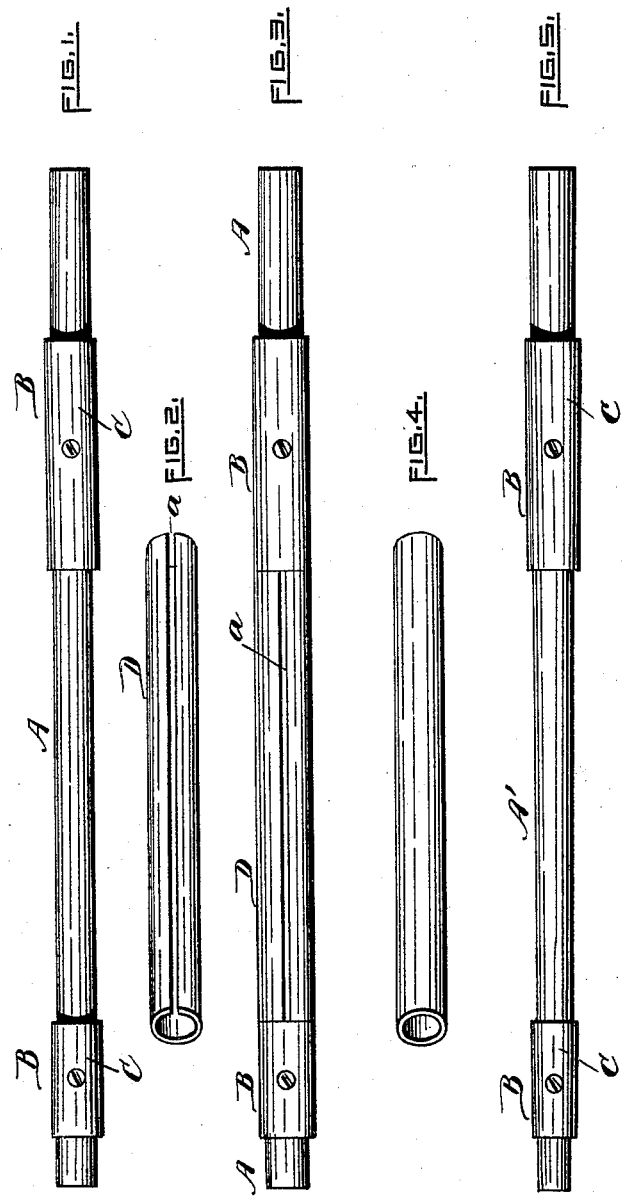

CHARLES R. SMITH, OF PROVIDENCE, RHODE ISLAND, ASSIGNOR TO THE C. R. SMITH PLATING COMPANY, OF KENTUCKY.

PROCESS OF MANUFACTURING SEAMLESS HOLLOW WIRE.

SPECIFICATION forming part of Letters Patent No. 449,182, dated March 31, 1891.

Application filed July 24, 1890. Renewed February 18, 1891. Serial No. 381,973. (No specimens.)

*To all whom it may concern:*

Be it known that I, CHARLES R. SMITH, of the city and county of Providence, in the State of Rhode Island, have invented a certain new and useful Improvement in Processes of Manufacturing Seamless Hollow Wire; and I declare the following to be a specification thereof, reference being being had to the accompanying drawings.

Like letters indicate like parts.

Figure 1 is a side elevation of the arbor upon which the hollow wire is formed. Fig. 2 is a perspective view of the split metallic shell which is to be made into seamless hollow wire. Fig. 3 shows in side elevation the split shell in position upon the arbor. Fig. 4 is a perspective view of the seamless hollow wire which is the product of my improved process. Fig. 5 is a representation of a modified form of the arbor.

My invention relates to the manufacture of metallic tubes known in the market as "hollow wire."

My improved process consists in drawing up a sheet of metal into the form of a longitudinally-split tube or shell, placing the same upon an arbor which has adjustable sleeves capable of being fastened in position thereon, the shell being located on the arbor between the sleeves, then passing the tube and arbor through the flame of blow-pipes and fusing the metallic shell into a solid mass upon the arbor, but not so as to adhere thereto, then drawing the shell so fused (while still in position upon the arbor) through a draw-plate to give the exterior surface a smooth finish, and then, after removing the sleeves, drawing off the fused tube from the arbor, as hereinafter more fully explained.

Referring to the drawings, A is an arbor, made of any suitable metal, preferably steel.

B B are sleeves fitting loosely on the arbor and capable of adjustment thereon at any desired position and of being fastened in such position by the set-screws C C.

A strip of metal is drawn up by means of a draw-plate or in any other suitable manner into the form of a split tube D, having a longitudinal opening *a*, as shown in Fig. 2.

One of the sleeves B is removed from the arbor A, and the arbor is covered with oil or other substance to prevent the adhesion of the metal which is to be heated in position upon it, as hereinafter described. The split tube D is then placed on the arbor, as illustrated in Fig. 3, and the sleeves B B are brought up to abut the tube on each side, repectively, and there fastened in position by the screws C C. The tube is thus immovably held in place during the operation which is to follow. The arbor A and the split tube D thereon are now passed through the flame of one or more blow-pipes, or may be heated in a furnace or in any suitable manner to such a degree as to melt and fuse the split tube D sufficiently to close the opening *a* and to make the tube D seamless throughout its entire length. No fluxing material should be used, as otherwise the shell D would be soldered or united to the arbor within it. The arbor should be made of such metal as will not amalgamate with the shell by being subjected to heat.

The arbor, with the tube upon it, should be fed to the flame by a longitudinal and rotary movement. Any suitable mechanism may be used for this purpose—as, for example, the machine shown in Letters Patent of the United States for an improved process of manufacturing seamless gold-plated wire, No. 428,056, dated May 13, 1890, granted to me and others; or said tube and arbor may be manipulated by hand for the purpose of properly presenting it to the flame. When the shell or tube has been thus fused, it is desirable to give it a smooth exterior finish by drawing it, still upon the arbor, through a draw-plate in the usual manner. The tube is then removed from the arbor by unfastening and taking off one of the sleeves, and then by placing one of the butt-ends of the tube against a draw-plate the arbor can be pulled out of the tube. The product of this process is the hollow wire shown in Fig. 4. If it is desired to reduce the hollow wire to a smaller diameter, it can be done by drawing it down successively on other arbors of less and less diameters through a draw-plate in the well-known manner.

Instead of closing the opening *a* of the split shell or tube by fusing, as above described, it may be closed by soldering, and the soldered tube can then be brazed down on the arbor by passing it through the heat, as above explained, and afterward drawn off from the arbor.

In Fig. 5 I show a modified form of the arbor, which is slightly tapered to facilitate the withdrawing of the tube therefrom after fusing. The product in that event will be a tapered hollow wire, but can be reduced to a straight wire by drawing it on a smaller straight cylindrical arbor by the usual method.

I claim as a novel and useful invention and desire to secure by Letters Patent—

1. The improved process of manufacturing hollow wire herein described, consisting in the formation of a longitudinally-split metallic tube, the use of a steel arbor having short metallic sleeves, covering said arbor with oil, placing said tube upon said arbor with said sleeves abutting the ends of said tube, respectively, passing said tube, arbor, and sleeves horizontally with a rotary and longitudinal movement through the flame of blow-pipes, so as to melt said tube and fuse its split edges together, drawing said tube so in position through a draw-plate for a finish, withdrawing said sleeves, and removing the tube from the arbor, substantially as specified.

2. The improved process of manufacturing hollow wire herein described, consisting in the formation of a longitudinally-split metallic tube, the use of a steel arbor covered with oil, placing said tube on the arbor, passing said tube and arbor horizontally with a rotary and longitudinal movement through the flame of blow-pipes, so as to melt said tube and fuse its split edges together, drawing said tube so in position through a draw-plate for a finish, and withdrawing said tube from said arbor, substantially as specified.

CHARLES R. SMITH.

Witnesses:
DANIEL W. FINK,
WARREN R. PERCE.